United States Patent
Ahmed

(10) Patent No.: US 7,418,138 B2
(45) Date of Patent: Aug. 26, 2008

(54) IMAGE PROCESSOR FOR AND METHOD OF PERFORMING TONAL TRANSFORMATION ON IMAGE DATA

(75) Inventor: Mohamed N. Ahmed, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 699 days.

(21) Appl. No.: 11/013,523

(22) Filed: Dec. 15, 2004

(65) Prior Publication Data

US 2006/0126931 A1 Jun. 15, 2006

(51) Int. Cl.
- G06K 9/46 (2006.01)
- G06K 9/40 (2006.01)
- G03F 3/08 (2006.01)

(52) U.S. Cl. .......................... 382/190; 382/254

(58) Field of Classification Search ................ 382/162, 382/164, 167, 172, 173, 181, 190, 195, 206, 382/254, 272, 305; 358/1.9, 515, 518, 520, 358/523, 524, 530; 345/549, 581, 589, 591, 345/601; 348/674, E5.074

See application file for complete search history.

(56) References Cited

U.S. PATENT DOCUMENTS

| | | | |
|---|---|---|---|
| 5,426,517 A * | 6/1995 | Schwartz | .................. 358/520 |
| 5,473,373 A | 12/1995 | Hwung et al. | |
| 5,920,645 A | 7/1999 | Aida | |
| 5,991,056 A * | 11/1999 | Takamori | .................. 358/523 |
| 6,026,181 A * | 2/2000 | Murakami | .................. 382/168 |
| 6,323,869 B1 * | 11/2001 | Kohm et al. | ................. 345/581 |
| 6,342,896 B1 | 1/2002 | Shetter et al. | |
| 6,445,362 B1 | 9/2002 | Tegreene | |
| 6,542,259 B1 | 4/2003 | Andersen et al. | |
| 6,549,678 B1 * | 4/2003 | Gindele et al. | ............. 382/254 |
| 6,661,393 B2 | 12/2003 | Tegreene et al. | |
| 7,352,490 B1 * | 4/2008 | Tse et al. | ..................... 358/1.9 |
| 2005/0254706 A1 * | 11/2005 | Bailey et al. | ................. 382/166 |
| 2006/0126931 A1 * | 6/2006 | Ahmed | ....................... 382/162 |

* cited by examiner

Primary Examiner—Amir Alavi

(57) ABSTRACT

A method of performing tonal transform on image data. The method includes extracting a portion of the image data, assigning one of a plurality of labels to the extracted portion, performing a first tonal transformation on the extracted portion if a first label is assigned to the extracted portion, and performing a second tonal transformation on the extracted portion if a second label is assigned to the extracted portion. The method can be performed, for example, with an image processor comprising a memory that stores the image data and a processor coupled to the memory.

27 Claims, 3 Drawing Sheets

IMAGE PROCESSOR FOR AND METHOD OF PERFORMING TONAL TRANSFORMATION ON IMAGE DATA

BACKGROUND

Embodiments of the invention relate to an image processor for and a method of performing a tonal transformation on image data.

An image scanned using an imaging device (e.g., a scanner, a multi-functional device such as a scanner-printer-facsimile machine, etc.) may have several tonal transformations performed on it before the resultant image is either displayed (e.g., on a personal computer (PC)) or printed (e.g., via a printer). One common type of tonal transformation is known as gamma correction. Gamma correction is usually performed by applying a power-law transformation to the pixels of a document. The correction maps input intensity values into transformed, output intensity values. The transformation has the basic form of $$s = cr^\gamma \qquad [e1]$$

where r is the input intensity value, s is the output intensity value, and c and γ are positive constants. Values for γ<1 has the effect of making the output lighter than the input, while values for γ>1 has the effect of making the output darker than the input.

SUMMARY

Applying a gamma correction has the drawback of reducing contrast, which may affect the quality of small and/or fine text or images. It would be beneficial to identify areas of a document (e.g., an image area, a background area, etc.) requiring corrected intensities while preserving the sharpness of other areas (e.g., text areas, etc.).

In one embodiment, the invention provides a method of performing tonal transform on image data. The method includes extracting a plurality of portions of the image data; assigning one of a plurality of labels to each of the plurality of extracted portions, the plurality of labels comprising a first label and a second label; performing a first tonal transformation on the extracted portion assigned the first label; and performing a second tonal transformation on the extracted portion assigned the second label.

In another embodiment, the invention provides an image processor for performing tonal transformation on image data. The image processor includes a memory storing the image data and a processor coupled to the memory. The processor, in one construction, is configured to extract a plurality of portions of the image data, assign one of a plurality of labels to each of the plurality of extracted portions, the plurality of labels comprising a first label and a second label, perform a first tonal transformation on the extracted portions assigned the first label, and perform a second tonal transformation on the extracted portions assigned the second label.

Other features and aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
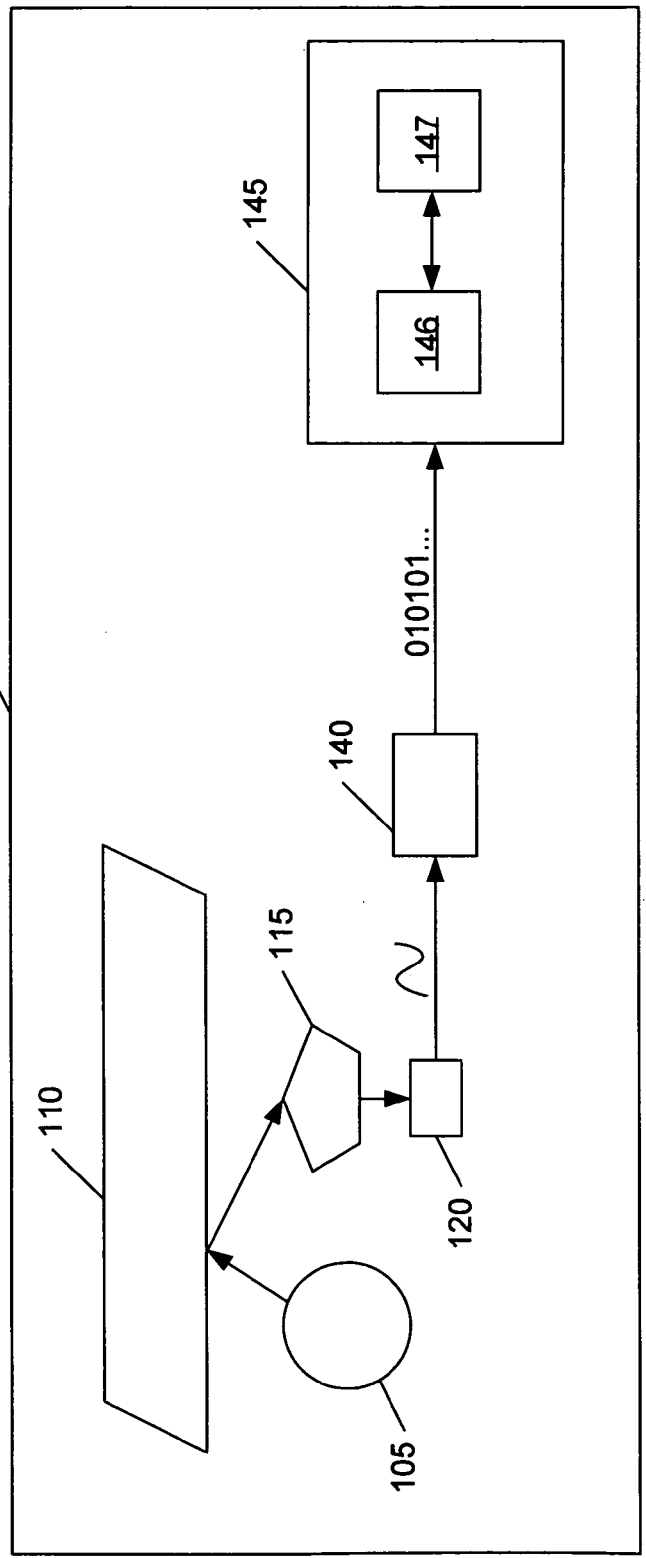
FIG. 1 is a schematic diagram representing a scanner incorporating the invention.

With reference to the Figures, various embodiments of the invention will now be shown and described. Like reference numerals are used to indicate the same element or step throughout the specification. FIG. 1 schematically represents an optical reduction scanner 100 incorporating the invention. While the invention will be described in connection with the scanner 100, the invention is not limited to the scanner 100. The invention can be used with any other apparatus (e.g., a multi-function device, a digital camera, etc.) requiring tonal transformation, particularly devices that require gamma correction. It is also envisioned that the invention can be implemented in software or customized hardware, and therefore, be executed by any appropriate electronic device (e.g., a microprocessor, a microcontroller, etc.) where the device performs tonal transformation. For example, the invention can be implement in software executable by a personal computer.

Figure 2:
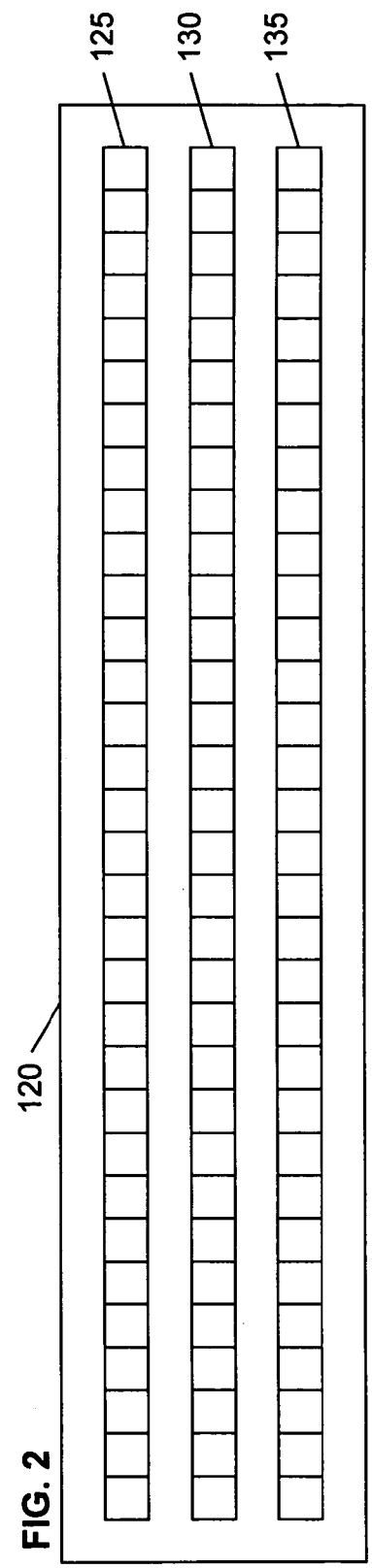
FIG. 2 is a schematic diagram representing an image sensor used in the scanner of FIG. 1.

With reference to FIG. 1, the scanner 100 includes a white light source 105 (e.g., a fluorescent bulb) that is used to illuminate a line of the target image 110 held by the scanner 100. The light reflects off of the target image 110 and is directed through optics or optical element 115. The optical element 115 shrinks the image down to the size of the image sensor 120. The image sensor 120 typically contains three rows of elements 125, 130, and 135 (shown in FIG. 2). Each row 125, 130, and 135 has a filter to detect a specific color. For example, FIG. 2 shows a charge-coupled device (CCD) image sensor having red, green, and blue line sensors 125, 130, and 135, respectively. Other line sensors are possible.

Each line sensor 125, 130, and 135 charges to a voltage level corresponding to the intensity of the color detected for that element. The voltage for each element of the captured line is then shifted out of the image sensor serially and sent to an analog front-end device 140 (FIG. 1), which contains an analog-to-digital (A/D) converter (not shown). The analog voltage level is converted to a digital value and sent to the digital controller application-specific-integrated-circuit (ASIC) 145. The exemplary ASIC 145 shown in FIG. 1 conceptually includes a processor 146 and a memory 147. The ASIC 145 processes the digital values and sends the processed information to a host PC for a scan-to-host operation or to a printer for a standalone copy operation. As used herein, a printer may be any device capable of performing a printing function, such as a standalone printer or a multifunctional device which performs other functions such as copying, faxing, or scanning in addition to printing.

It should be noted that the scanner 100 includes other components not shown or described herein. For example, the scanner 100 includes a scanner motor to move the light source 105, optics 115, and image sensor 120 across the target image. It should also be noted that the scanner discussed in FIG. 1 is an optical reduction scanner. However, other scanner types (e.g., contact image sensor scanners) can incorporate the invention. Also, the elements and arrangement of the elements shown in FIG. 1 provide only one example of an optical reduction scanner. Other constructions of the optical reduction scanner are possible (e.g., the optical reduction scanner can be microprocessor based rather than ASIC based.). Additionally, the scanner may be any device capable of performing a scanning function, such as a standalone scanner or a multifunctional device which performs other functions such as copying, faxing, or printing in addition to scanning.

Figure 3:
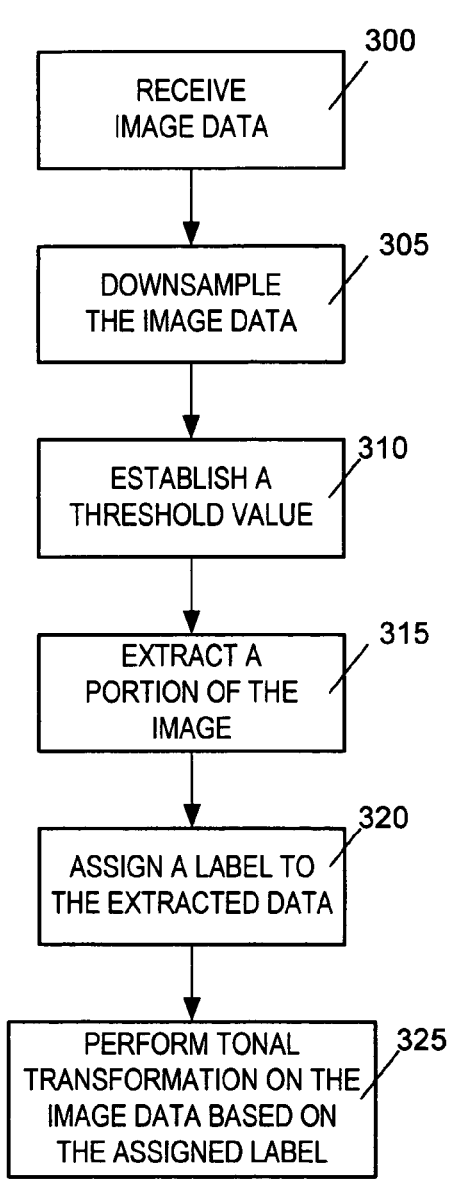
FIG. 3 is a flow chart representing a dynamic gamma correction technique.

As previously stated, the ASIC 145 processes the digital values. For example, the ASIC 145 can perform a tonal transformation on the digital values using various correction techniques. For example, FIG. 3 shows a method of performing dynamic gamma correction on the digital values with the ASIC 145.

At block 300, the ASIC 145 receives image data having one or more attributes from the analog front-end device 140. For the construction shown, the image data represents one of three intensities: red, green, or blue. However, other attributes are possible and the image data can be obtained from other devices (e.g., a memory or a storage device). Using the image data, the ASIC 145 performs a dynamic gamma correction on each of the three intensity types. That is, the ASIC 145 performs a first dynamic gamma correction on the red intensity values, a second dynamic gamma correction on the green intensity values, and a third dynamic gamma correction on the blue intensity values. However, it is envisioned that the dynamic gamma correction can be performed differently on the three intensities. For example and in some constructions, a dynamic gamma correction can be performed on combined intensity values for the three intensity types. The remainder of FIG. 3 will be discussed in connection with the ASIC 145 performing dynamic gamma correction on the red intensity values only.

At block 305, the ASIC 145 downsamples the red image data by keeping every $M^{th}$ (e.g., fourth) value and discarding the rest. Block 305, while not required for all methods, helps to reduce the number of computations performed on the scanned image data.

At block 310, the ASIC 145 establishes a threshold value. In one method (shown in FIG. 4), the ASIC 145 establishes the threshold value using an adaptive thresholding technique, which separates the image data into two groups based on the assumption that the intensity distribution is bimodal. However, it should be understood that the image data could be divided into more than two groups. Moreover, other methods can be used to establish the threshold value, such as obtaining it from memory.

Figure 4:
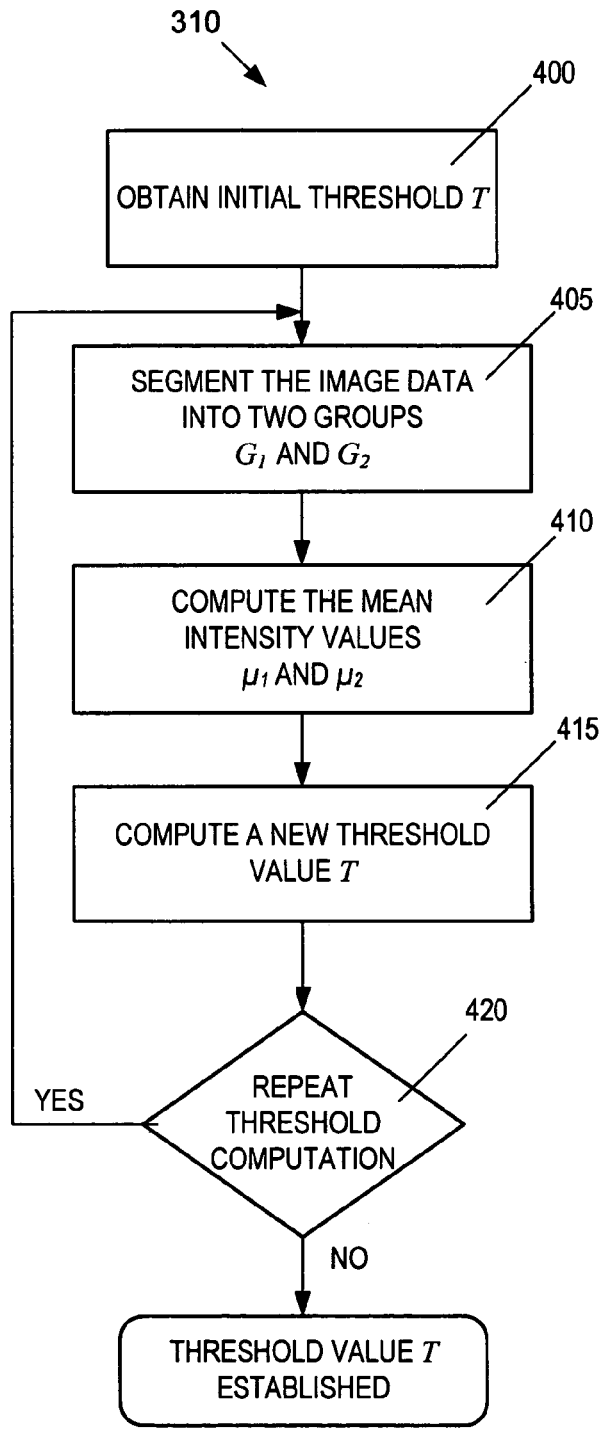
FIG. 4 is a flow chart representing an adaptive threshold technique capable of being used with the dynamic gamma correction technique of FIG. 3.

With reference to FIG. 4, an initial threshold value T is selected (block 400). At block 405, the ASIC 145 segments the image data into two groups of values $G_1$ and $G_2$ using the initial threshold value T. The group $G_1$ consists of the values greater than or equal to the initial threshold value T and the group $G_2$ consists of the values less than the initial threshold value T.

At block 410, the ASIC 145 computes the mean intensity values $\mu_1$ and $\mu_2$ for the two groups $G_1$ and $G_2$, respectively. At block 415, the ASIC 145 computes a new threshold value T using equation [e2].

$$T = \frac{(\mu_1 + \mu_2)}{2} \quad [e2]$$

At block 420, the ASIC 145 determines whether the difference between successive iterations of the threshold value T is less than a predefined parameter $T_o$, indicating the end of operation.

Figures 5, 6:
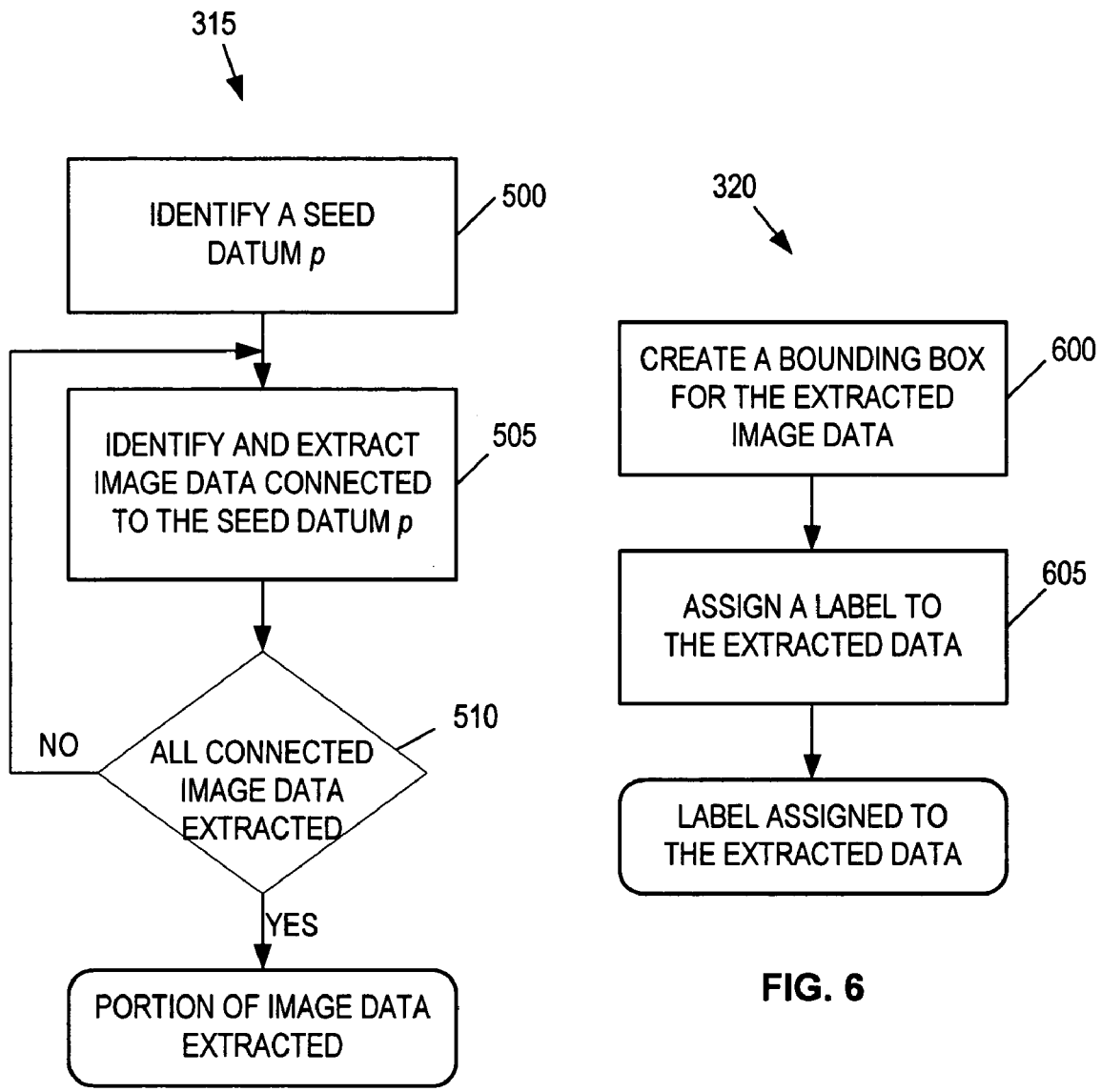
FIG. 5 is a flow chart representing a binary morphology extraction technique capable of being used with the dynamic gamma correction technique of FIG. 3.
FIG. 6 is a flow chart representing one technique capable of being used with the dynamic gamma correction technique of FIG. 3 for labeling extracted image data.

Referring again to FIG. 3, the ASIC 145 extracts a portion of the scanned image (block 315) after establishing the threshold value T. The resulting extracted portion may be referred to herein as a subgroup of image data. In the method shown in FIG. 5, the ASIC 145 uses binary morphology to extract a portion of the image data. At block 500, the ASIC 145 locates a first value of the image data greater than the threshold value T. The first value is referred to as the seed image datum p in the binary image I. The ASIC 145 then performs an iterative algorithm to yield all image data greater than the threshold T that are connected to the seed image datum p (block 505). An example algorithm is shown in equation [e3]

$$X_k = (X_{k-1} \oplus B) \cap I \quad [e3]$$

where $X_o = p$ and $$B = \begin{bmatrix} 1 & 1 & 1 \\ 1 & 1 & 1 \\ 1 & 1 & 1 \end{bmatrix}$$

The algorithm is repeated until all connected components are extracted (block 510). It should be understood that other methods can be used to extract the connected components.

At block 320 in FIG. 3, the ASIC 145 assigns or associates a label to the extracted image data. In one method (shown in FIG. 6), the ASIC 145 creates a bounding box for the extracted image data (block 600). At block 605, the ASIC 145 assigns a label (e.g., a label signifying text, image, background, etc.) to the extracted image data depending on a characteristic of the image data, such as the size of the bounding box, the aspect ratio of the bounding box, and/or some other considerations. For example, larger bounding boxes having a higher aspect ratio typically signifies images or backgrounds; while smaller, rectangular-like bounding boxes having a lower aspect ratio typically signifying text. The ASIC 145 can also use other generalities to label the extracted components.

Referring back to FIG. 3, the ASIC 145 performs one or more tonal transformations on the image data as a result of the label assigned to the image data (block 325). For example, a first gamma correction $\gamma_1$ (e.g., $\gamma < 1$) can be performed on a datum designated as an image or background datum, and a second gamma correction $\gamma_2$ different than the first gamma correction $\gamma_1$ can be performed on an image datum designated as a text datum.

Thus, the invention provides, among other things, a new and useful method of performing tonal transformation on image data. As described above, FIGS. 3-6 provide one representative method for performing tonal transformation on image data. However, other methods can be performed. For example, it is envisioned that the order of the blocks shown in FIGS. 3-6 can vary, that not all of the blocks are required, and two or more blocks can be performed concurrently. The invention also provides, among other things, a new and useful image processor for performing tonal transformation on image data. Various features and advantages of the invention are set forth in the following claims.

What is claimed is:

1. A method of performing tonal transformation on image data, the method comprising:
    extracting a plurality of portions of the image data;
    assigning one of a plurality of labels to each of the plurality of extracted portions, the plurality of labels comprising a first label and a second label;
    performing a first tonal transformation on the extracted portion assigned the first label; and
    performing a second tonal transformation on the extracted portion assigned the second label.

2. The method as set forth in claim 1, further comprising: obtaining an image file comprising the image data.

3. The method as set forth in claim 2, wherein the image data comprises a plurality of intensities of a color tone.

4. The method as set forth in claim 1, wherein the image data represents an image and wherein the method further comprises acquiring the image data with one of the group consisting of a scanner, a digital camera, a facsimile machine, and a digital video camera.

5. The method as set forth in claim 1, further comprising: downsampling the image data.

6. The method as set forth in claim 1, further comprising: establishing a threshold value for the image data, and wherein extracting one of the plurality of portions of the image data comprises
    selecting an image datum having an intensity value with a relation to the threshold value; and
    identifying the image data having intensity values with the same relation to the threshold value as the selected image datum and being connected to the selected image datum.

7. The method as set forth in claim 6, wherein the relation is the intensity value being greater than the threshold value.

8. The method as set forth in claim 6, wherein establishing a threshold value comprises retrieving the threshold value from memory.

9. The method as set forth in claim 6, wherein establishing a threshold value comprises performing an adaptive thresholding technique to determine the threshold value.

10. The method as set forth in claim 9, wherein performing an adaptive thresholding technique comprises:
    setting an initial threshold value;
    segmenting the image data into a plurality of groups;
    computing a mean value for each of the plurality of groups; and
    computing a new threshold value based on the mean values.

11. The method as set forth in claim 10 wherein performing an adaptive thresholding technique further comprises repeating the segmenting and computing acts.

12. The method as set forth in claim 10 wherein segmenting the image data comprises:
    segmenting a first image datum into a first of the plurality of groups when a value of the first image datum is greater than the initial threshold value, and
    segmenting a second image datum into a second of the plurality of groups when the value of the second image datum is less than the initial threshold value.

13. The method as set forth in claim 1, wherein assigning one of a plurality of labels is based on a characteristic of the extracted portion.

14. The method as set forth in claim 13, wherein the characteristic is the aspect ratio of the extracted portion.

15. The method as set forth in claim 13, wherein the characteristic is the size of the extracted portion.

16. The method as set forth in claim 1, wherein the first tonal transformation is a gamma correction using a first gamma value and the second tonal transformation is a gamma correction using a second gamma value.

17. An image processor for performing tonal transformation on image data, the image processor comprising:
    a memory comprising the image data; and
    a processor configured to extract a plurality of portions of the image data, assign one of a plurality of labels to each of the plurality of extracted portions, the plurality of labels comprising a first label and a second label, perform a first tonal transformation on the extracted portions assigned the first label, and perform a second tonal transformation on the extracted portions assigned the second label.

18. The image processor as set forth in claim 17, wherein the processor is implemented via an application specific integrated circuit.

19. The image processor as set forth in claim 17, wherein the processor is implemented via a computer.

20. The image processor as set forth in claim 17, wherein the processor is configured to perform the first tonal transformation on the extracted portion by performing a first gamma correction using a first gamma value on the extracted portion, and wherein the image processor is configured to perform the second tonal transformation by performing a second gamma correction using a second gamma value on the extracted portion.

21. A method of performing tonal transformation on image data of an image file, the method comprising:
    dividing at least a portion of the image data into at least two subgroups of image data based on an attribute of the image data, the at least two subgroups of image data comprising a first subgroup of image data and a second subgroup of image data;
    performing a first tonal transformation on the first subgroup of image data; and
    performing a second tonal transformation on the second subgroup of image data, the second tonal transformation being different from the first tonal transformation.

22. The method as set forth in claim 21, wherein the attribute comprises an intensity value for each image datum.

23. The method as set forth in claim 22, wherein dividing at least a portion of the image data into the first subgroup comprises:
    selecting an image datum having an intensity value with a relation to a threshold value, and
    identifying image data having intensity values with the same relation to the threshold value as the selected image datum and being connected to the selected image datum; and wherein performing a first tonal transformation on the first subgroup comprises performing a first tonal transformation on the selected and identified image data.

24. The method as set forth in claim 23, wherein the relation is the intensity value being greater than the threshold value.

25. The method as set forth in claim 23, wherein the threshold value is determined by performing an adaptive thresholding technique comprising:
   setting an initial threshold value;
   segmenting the image data into a plurality of groups;
   computing a mean value for each of the plurality of groups;
   computing a new threshold value based on the mean values; and
   repeating the segmenting and computing acts.

26. The method as set forth in claim 21, further comprising:
   assigning one of a plurality of labels to each of the at least two subgroups of image data, the plurality of labels comprising a first label and a second label; and
   wherein performing a first tonal transformation and performing a second tonal transformation is based on the respective label assigned to the first and second subgroups.

27. The method as set forth in claim 21, wherein the first tonal transformation is a gamma correction using a first gamma value and the second tonal transformation is a gamma correction using a second gamma value.

* * * * *